Aug. 21, 1928.
A. M. KENNEDY
1,681,642
AEROPLANE
Filed Aug. 25, 1926  2 Sheets-Sheet 1
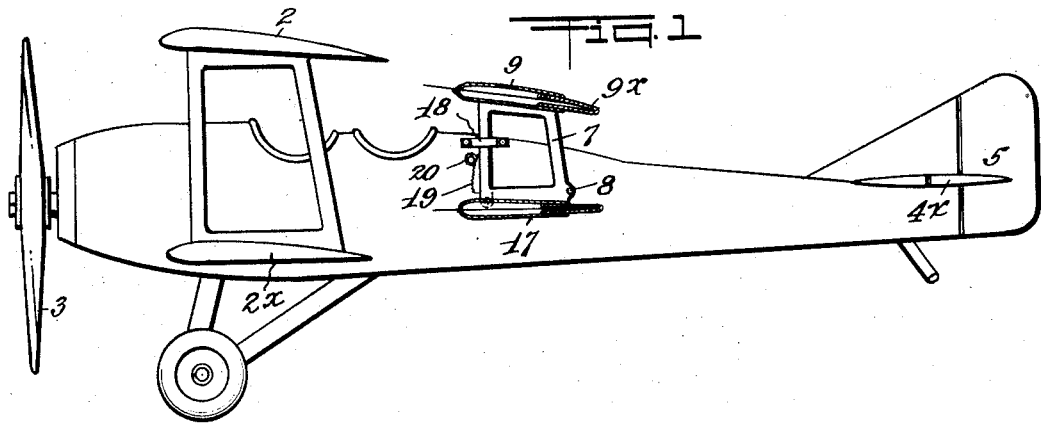
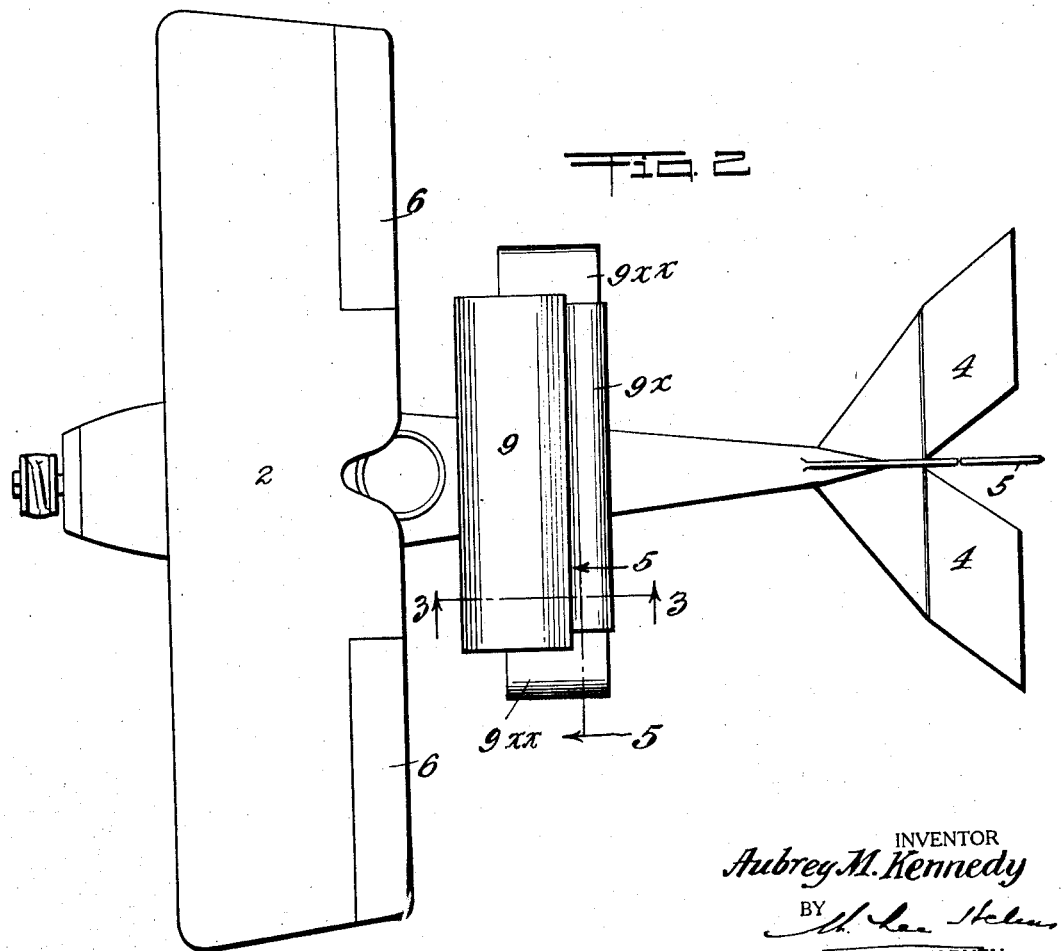
INVENTOR
Aubrey M. Kennedy
BY
ATTORNEY Aug. 21, 1928. 1,681,642
A. M. KENNEDY
AEROPLANE
Filed Aug. 25, 1926 2 Sheets-Sheet 2
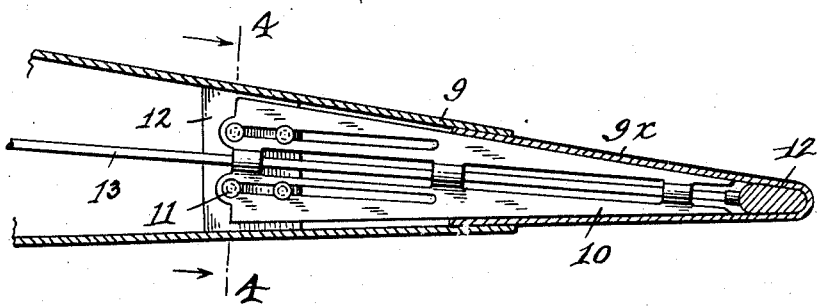
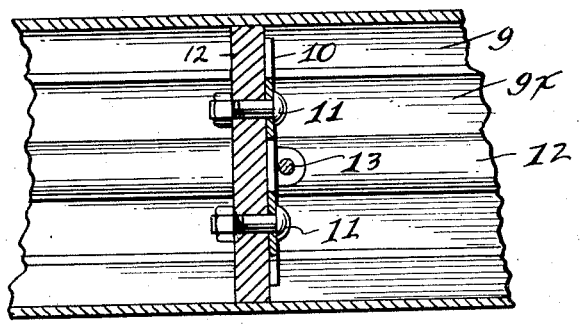
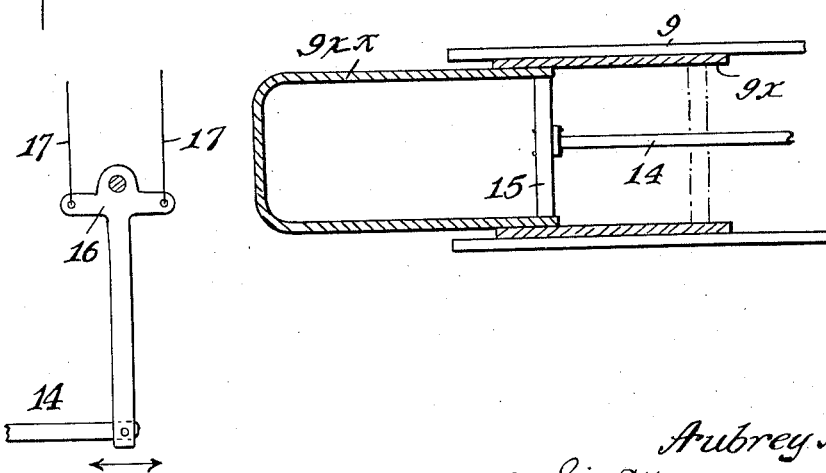
Inventor
Aubrey M. Kennedy
By his Attorney Patented Aug. 21, 1928.

1,681,642

UNITED STATES PATENT OFFICE.

AUBREY M. KENNEDY, OF LOS ANGELES, CALIFORNIA.

AEROPLANE.

Application filed August 25, 1926. Serial No. 131,325.

The object of the present invention is to provide an aeroplane having means by which varying loads and conditions of flight can be compensated for, without changing the normal attitude. In other words, the longitudinal axis of the plane may be maintained in a substantially horizontal line for varying loads and conditions of flight. In actual flight the altitude is frequently varied as well as the speed. Again the load is not a constant quantity, even the weight of fuel diminishing with the length of the time of flight. To meet these variations it has been necessary to alter the lift of the wings in accordance with the loading and speed, and this has been done by turning the body, to change the angle of incidence of the wing structure, increases in the load requiring the turning of the body, so that the tail is brought downward, by raising the elevator, the aeroplane assuming an angle as if in climbing, although change in altitude is not obtained or desired. Such a position of the plane, compelled in order to maintain altitude under a relatively heavy load, reduces the speed range of the plane, and also interferes with the control, preventing normal action of the elevator and quick response to variations in position thereof. This invention is particularly designed to remove such objections.

The invention will be understood by reference to the accompanying drawings, in which—

Figure 1 is a side elevation, largely diagrammatic, of an aeroplane, constructed in accordance with the invention, the auxiliary wings being shown in section, and Figure 2 is a plan view of the same in full lines;

Figure 3 is an enlarged fragmentary section of the auxiliary wing tip on the line 3—3, Figure 2;

Figure 4 is a fragmentary and enlarged section on the line 4—4, Figure 3, and

Figure 5 is a section on the line 5—5, Figure 2, looking in the direction of the arrows.

Fig. 5ª is a detail view of an operating lever showing connections thereto.

Referring to the drawings, the invention is shown in conjunction with a conventional type of aeroplane, comprising a fuselage or body 1, with forwardly disposed primary wings 2, 2$^x$, a propeller 3 (driven by an engine, not shown), the elevators 4, 4$^x$, and the vertical rudder 5, the wings 2 being provided with ailerons 6.

Disposed rearwardly of the main wing structure is an auxiliary wing structure which will now be described:

At each side of the fuselage is disposed a rigid supporting frame 7 which is pivotally connected to the fuselage at 8. In practice the two frames 7 may be connected by cross braces so as to move in unison independently of their connection by the auxiliary wings. Extending above the fuselage and rigidly connected to frame member 7 is the primary auxiliary wing which slidably supports at the rear thereof an adjustable rear section 9$^x$ which in turn slidably supports at each end and adjustable end section 9$^{xx}$.

Any suitable means may be employed for supporting the adjustable sections 9$^x$, 9$^{xx}$ within or on the wing 9. In Figure 3 I have shown one means of supporting section 9$^x$. It comprises a plurality of light but strong metallic ribs 10, which may be made of duralumin or the like (one rib being shown, the rib being slidably connected by the studs 11 to a bracket 12). Rib 10 may be connected to a spar or noising 12. In the form shown, the nosing has connected thereto a stiff rod 13 which may be connected with any conventional means for imparting, therethrough, endwise movements to section 9$^x$ from the fuselage seat.

Each of the adjustable wing sections 9$^{xx}$ may be moved inwardly or outwardly by any suitable means operated from the fuselage seat. For example (see Figure 5), a rod 14 connected to strut 15 of wing section 9$^{xx}$ may be led to a reversely operable lever 16 (Figure 5ª), which lever may be operated by cables 17 to impart endwise movements to the rod. Such a lever and cable connection may be employed in conjunction with the rod or rods 13, Figure 3.

Below main auxiliary wing 9 and at each side of the fuselage is a secondary auxiliary wing 17 of exactly the same construction as either the left hand or the right hand half of the said main auxiliary wing structure with its adjustable sections and, therefore, wing structure 17 does not require further description. It will, of course, be rigidly carried by frame member 7.

Means will be provided for moving the auxiliary wing frame on pivot 8 so as to change the angle of incidence of the auxiliary wing structure as a whole. I have shown frame 7 guided by straps 18 (one being shown) and having a rack 19 engaged by pinion 20 by means of which the auxiliary wing structure may be swung as a whole in pivot 8.

By means of the adjustable wing structure the aeroplane can fly under changing conditions on an even keel, and the thrust can be maintained in a constant direction with respect to the flight path. The improvements make possible a great increase in the speed range of the aeroplane, by increasing the maximum and decreasing the minimum speed. The improvements are particularly useful in cargo carrying planes as the adjustable feature of the auxiliary wing will increase the carrying capacity of the planes so equipped enabling them to rise with far greater loads than at present and when once off the ground to proceed at a speed equal to the single wing structure planes which are standard at present.

The improvements can be applied both to monoplanes, bi-planes and tri-planes, and so forth. The auxiliary wing structure is smaller than the front or leading wing structure and does not increase the wing resistance to any appreciable degree.

Having described my invention what I claim and desire to secure by Letters Patent is as follows:—

1. An aeroplane comprising a fuselage, propelling and guiding means, a primary wing structure, and an auxiliary wing structure smaller than the primary wing structure and mounted at the rear and independently of the latter, said auxiliary wing structure comprising a wing having telescopic sections and means for relatively adjusting said sections.

2. An aeroplane comprising a fuselage, propelling and guiding means, a primary wing structure, and an auxiliary wing structure smaller than the primary wing structure and mounted at the rear and independently of the latter, said auxiliary wing structure comprising telescopic sections permitting increase or decrease of the wing spread both longitudinally and transversely thereof.

3. An aeroplane comprising a fuselage, propelling and guiding means, a primary wing structure, and an auxiliary wing structure smaller than the primary wing structure and mounted at the rear and independently of the latter, said auxiliary wing structure having a telescopic rear section and means for adjusting said section to increase or decrease the wing spread.

4. An aeroplane comprising a fuselage, propelling and guiding means, a primary wing structure, and an auxiliary wing structure smaller than the primary wing structure and mounted at the rear and independently of the latter, said auxiliary wing structure having telescopic end sections to decrease or increase the wing spread.

In testimony whereof, I have signed my name to this specification.

AUBREY M. KENNEDY.